United States Patent Office 3,657,334
Patented Apr. 18, 1972

3,657,334
PROCESS FOR PRODUCING ADIPIC ACID
Girandra Narain Kulrestha, Derhadun (U.P.), India, and Irénée Seree de Roch, Rueil Malmaison, Hauts-de-Seine, France, assignors to Institut Francais du Petrole, des Carburants et Lubrifiants, Rueil Malmaison, France
No Drawing. Filed Dec. 4, 1969, Ser. No. 882,321
Int. Cl. C07c 51/28
U.S. Cl. 260—531 R                17 Claims

ABSTRACT OF THE DISCLOSURE

Adipic acid is prepared by oxidizing cyclohexanone in the liquid phase with molecular oxygen in the presence of a catalyst system consisting essentially of a manganese compound, a copper compound, and a compound of a metal from Group IIa of the Periodic Table, e.g., barium, calcium, magnesium, and strontium. The use of the compound of the Group IIa metal results in an increased yield of adipic acid.

---

This invention relates to a process for manufacturing adipic acid by oxidation of cyclohexanone in the liquid phase by means of molecular oxygen.

According to the present invention cyclohexanone is oxidized in solution in a carboxylic acid such as acetic acid with the use of a catalyst including three essential elements: a manganese compound, a copper compound and a compound of a metal from Group IIa of the Periodic Chart of Elements.

It is already known to conduct said reaction in the presence of manganese and copper compounds. The use of a compound of a metal from Group IIa results in an increase in the yield of adipic acid. Moreover when one of the preceding metals is partly or entirely substituted with another metal, a drop in yields is observed.

In the process according to the invention there are used preferably salts or compounds, soluble in the carboxylic acid, of manganese, copper and at least one metal from Group IIa such as Ba, Ca, Mg and Sr.

The oxidation is carried out by means either of pure oxygen or of air or also by means of oxygen more or less diluted with nitrogen. In all cases the oxygen partial pressure at the reactor inlet is preferably about between 0.10 and 12 kg./cm.$^2$.

The solvent consists for instance of a saturated carboxylic acid containing 2 to 6 carbon atoms, particularly acetic acid, butyric acid or also acetic acid in admixture for instance with higher homologs thereof, particularly propionic acid.

The water content of the reaction mixture is kept lower than 20%, for example between 0.001 and 20% with respect to the acetic acid used as solvent.

The presence of cyclohexanol in the cyclohexanone is not detrimental to the achievement of high selectivities in in adipic acid, with contents between 0.001 and 5% by weight; it enhances the oxidation velocity in otherwise unchanged conditions.

It has been discovered in the present invention that high selectivities in adipic acid, of about 90% molar, were dependent on a suitable selection of the operating conditions.

For a given temperature the Mn concentration as well as the ratio Mn/Cu/metal from Group IIa required for obtaining an optimum yield are dependent on the oxygen partial pressure at the reactor inlet and on the oxygen flow rate.

The manganese content will be usually higher than 10 p.p.m., the copper content higher than 5 p.p.m. and the content in metal from Group IIa higher than 60 p.p.m. Preferably the contents in Mn, Cu and metal from Group IIa will be within the respective ranges of 10–1500 p.p.m., 5–2000 p.p.m. and 60–3000 p.p.m. The concentrations are given in p.p.m. by weight of metal with respect to the feedstock.

The catalyst and the promotors can be introduced in the reaction medium in various forms, provided that these forms are soluble in the reaction medium. Advantageously there will be used acetates of manganese, copper and barium. Salts of acids having a long carbon chain may also be used but their catalytic activity is lower. Thus the use of stearates (carboxylates of 18 carbon atoms) or naphthenates instead of acetates (carboxylates of 2 carbon atoms) requires higher temperatures in order to obtain the same rate of oxidation.

According to the present invention the ratio by weight:

$$\varphi = \frac{\text{acetic acid}}{\text{cyclohexanone}}$$

will preferably be such that $1 \leq \varphi \leq 20$. The oxidation itself is conducted within a temperature range of from 60 to 120° C. and preferably between 60 and 100° C.

The rate of conversion of cyclohexanone will be about 20 to 85%; generally the conversion rate will be limited to 40%.

In the following non-limitative examples, the oxidations have been carried out batchwise in a reactor of the open type. The adipic acid has been separated by crystallization from the reaction medium and purification by recrystallization in pure acetic acid.

The cyclohexanone content was determined by gaseous phase chromatography and by hydroxylamine titration according to the method of Smith and Mitchel. The caprolactone content has been determined by gaseous phase chromatography on a column (Carbowax 4,000 terephthalic acid). The oxygen flow rates are in liter/kg. of feedstock/min. at 20° C. and 1 atmosphere.

EXAMPLES 1 TO 7

In the following examples showing by way of illustration the state of the prior art, manganese acetate has been used alone. The oxidation time is 6 hours.

| Example Number | Ratio by weight of acetic acid to cyclohexanone | Catalyst, p.p.m. by weight | Temperature, °C. | Flow rate, liters kg./mn. | Inlet partial pressure of oxygen, mm. Hg | Conversion rate, percent | Yield, percent mol Adipic acid | Caprolactone |
|---|---|---|---|---|---|---|---|---|
| 1 | 4 | 63 | 70 | 3.6 | 810 | 6.2 | 64.8 | 30 |
| 2 | 4 | 63 | 80 | 3.6 | 810 | 20.1 | 68 | 27 |
| 3 | 4 | 63 | 90 | 3.6 | 810 | 44.3 | 64.3 | 18.2 |
| 4 | 4 | 63 | 90 | 7 | 810 | 40.9 | 70 | Traces |
| 5 | 4 | 63 | 110 | 3.6 | 850 | 81.9 | 68.1 | Traces |
| 6 | 3 | 63 | 110 | 3.6 | 970 | 78.8 | 58 | |
| 7 | 4 | 63 | 120 | 7 | 970 | 85 | 51 | |

EXAMPLES 8 TO 15

The oxidation of cyclohexanone in solution in acetic acid has been conducted in the presence of manganese acetate and copper acetate according to a known technique. The ratio by weight of acetic acid to cyclohexanone is 4 in all cases.

| Example number | Catalyst, p.p.m. by weight Mn | Catalyst, p.p.m. by weight Cu | Temperature, °C. | Flow rate, liters/ kg./mn. | Inlet partial pressure of oxygen, mm. Hg | Time, hr. | Conversion rate, percent | Molar yield, percent Adipic acid | Molar yield, percent Caprolactone |
|---|---|---|---|---|---|---|---|---|---|
| 8 | 65 | 320 | 110 | 3.6 | 970 | 4 | 90.2 | 51.5 | 4.3 |
| 9 | 65 | 320 | 90 | 3.6 | 970 | 4 | 93.0 | 70.7 | 8 |
| 10 | 65 | 320 | 90 | 3.6 | 810 | 4 | 49.4 | 62 | 8 |
| 11 | 65 | 320 | 70 | 3.6 | 810 | 4 | 83.8 | 70.5 | 3 |
| 12 | 65 | 320 | 90 | 7.0 | 810 | 4 | 94.6 | 61.3 | 7 |
| 13 | 65 | 320 | 90 | 3.6 | 810 | 6 | 93.7 | 60.3 | 18.3 |
| 14 | 65 | 13 | 70 | 3.6 | 810 | 6 | 11.5 | 61.6 | 37.6 |
| 15 | 65 | 112 | 70 | 3.6 | 810 | 6 | 18 | 62 | 36 |

The addition of copper to the reaction mixture provides for a possible increase of the oxidation rate of cyclohexanone but not an improvement of the selectivity in adipic acid. Thus, in Example 1, at 70° C., in the presence of manganese alone, the conversion rate is 6.2% in 6 hours, and in the presence of copper in Example 14, it amounts to 11.5%, the selectivity in adipic acid being respectively 64.8% and 61.6% and the selectivity in caprolactone being higher in the second case: respectively 30 and 37.6%.

EXAMPLES 16 TO 27

In these examples the oxidations have been conducted in the presence of salts of copper and manganese. To the reaction medium were added alkaline-earth compounds. The ratio by weight of acetic acid to cyclohexanone is 4.

EXAMPLE 29

Examples 18 to 24 are repeated but with addition of water to the reaction medium. In the case of Example 18 there is used as solvent acetic acid with a 10% content of water. The conversion in 4 hours is 47%; the selectivity in adipic acid is 75%, the caprolactone being present only as traces.

Example 24 is repeated with the use of acetic acid having a 4% water content. The results are substantially unchanged.

EXAMPLE 30

Example 24 is repeated but with the use of acetic acid having a 10% by weight content of propionic acid, the other conditions being kept unchanged. After 6 hours the

| Example number | Catalyst | P.p.m. | Temperature, °C. | Flow rate, liters/ kg./mn. | Partial pressure inlet, mm./Hg | Time, hr. | Conversion rate, percent | Molar yield, percent Adipic acid | Molar yield, percent Caprolactone |
|---|---|---|---|---|---|---|---|---|---|
| 16 | Mn / CaO / Cu | 63 / 286 / 320 | 90 | 3.6 | 810 | 4 | 86.2 | 66.3 | 6.8 |
| 17 | Mn / CaO / Cu | 64 / 286 / 320 | 90 | 3.6 | 970 | 4 | 94.2 | 70.0 | 6.4 |
| 18 | Mn / CaO / Cu | 64 / 286 / 13 | 90 | 3.6 | 800 | 4 | 68.6 | 83.4 | 5.9 |
| 19 | Mn / Ba / Cu | 64 / 503 / 13 | 90 | 3.6 | 800 | 6 | 74.4 | 81.6 | 3.5 |
| 20 | Mn / Ba / Cu | 64 / 503 / 13 | 90 | 3.6 | 800 | 6 | 81.0 | 83.4 | 3.8 |
| 21 | Mn / Ba / Cu | 64 / 503 / 13 | 90 | 5.1 | 820 | 6 | 77.3 | 78.2 | 3.8 |
| 22 | Mn / Ba / Cu | 64 / 503 / 13 | 90 | 7.0 | 820 | 6 | 70.1 | 70.1 | 3.5 |
| 23 | Mn / Ba / Cu | 64 / 503 / 13 | 90 | 2.0 | 820 | 6 | 81.3 | 76.4 | 3.8 |
| 24 | Mn / Ba / Cu | 64 / 503 / 13 | 80 | 3.6 | 820 | 6 | 53.9 | 87.2 | 4.9 |
| 25 | Mn / Ba / Cu | 64 / 503 / 13 | 100 | 3.6 | 820 | 6 | 89.1 | 67.0 | 2.5 |
| 26 | Mn / Ba / Cu | 64 / 503 / 13 | 60 | 3.6 | 820 | 6 | 14.5 | 92.0 | Traces |
| 27 | Mn / Ba / Cu | 64 / 503 / 13 | 70 | 3.6 | 820 | 6 | 35.6 | 93.9 | 4.6 |

Manganese, barium and copper have been used in the form of acetates except in Examples 17 and 20 where manganese adipate was used.

EXAMPLE 28

Example 27 is repeated except that cyclohexanone contains 2% of cyclohexanol, all other conditions being unchanged. The conversion in 6 hours is 38% and the molar yield in adipic acid is 94.5%.

conversion rate is 53% and the yield of adipic acid is 87%.

What we claim as our invention is:

1. In a process for manufacturing adipic acid by oxidation, in the liquid phase, of cyclohexanone by means of molecular oxygen, wherein molecular oxygen is contacted with cyclohexanone in solution in a saturated carboxylic acid of 2–6 carbon atoms, and wherein the reaction is conducted in the presence of above 10 p.p.m. of at least one dissolved manganese compound and above 5 p.p.m. of at least one dissolved copper compound, the improvement comprising conducting said reaction in the further presence of above 60 p.p.m. of at least one dissolved compound of a metal from the Group IIa of the Periodic Chart of Elements.

2. A process according to claim 1 wherein the proportion, in parts per million of parts (p.p.m.) by weight, with respect to the reaction mixture, is from 10 to 1,500 p.p.m. for manganese, 5 to 2,000 p.p.m. for copper and 60 to 3,000 p.p.m. for the metal of Group IIa.

3. A process according to claim 1, wherein the carboxylic acid used as solvent is acetic acid.

4. A process according to claim 3 wherein the acetic acid is used in admixture with at least one of its higher homologs.

5. A process according to claim 3, wherein the acetic acid contains from 0.001 to 20% by weight of water.

6. A process according to claim 1, wherein the cyclohexanone is used in a pure state.

7. A process according to claim 1 wherein the cyclohexanone contains from 0.001 to 5% by weight of cyclohexanol.

8. A process according to claim 1 wherein oxygen is in the form of pure oxygen, air, or a mixture of oxygen and nitrogen.

9. A process according to claim 1, wherein the oxygen partial pressure at the inlet of the reactor is between 0.1 and 12 kg./cm.$^2$.

10. A process according to claim 3 wherein the cyclohexanone content of the reaction medium is such that the ratio by weight of acetic acid to cyclohexanone is between 1 and 20.

11. A process according to claim 1, wherein the oxidation temperature is between 60 and 120° C.

12. A process according to claim 1, wherein the oxidation temperature is between 60 and 100° C.

13. A process according to claim 1 wherein said reaction is conducted in the absence of metal compounds of other metals.

14. A process according to claim 1 wherein said compound of a IIa metal is a carboxylate of 2–18 carbon atoms.

15. A process according to claim 14 wherein said compound is an acetate.

16. A process according to claim 1 wherein said IIa metal is barium, and all the compounds are acetates.

17. A process according to claim 1 wherein said IIa metal is magnesium, calcium, strontium or barium.

References Cited

UNITED STATES PATENTS

| | | | |
|---|---|---|---|
| 3,234,271 | 2/1966 | Barker et al. | 260—537 |
| 2,241,487 | 5/1941 | Slatterbeck | 260—537 |
| 2,005,183 | 6/1935 | Flemming et al. | 260—537 |

LORRAINE A. WEINBERGER, Primary Examiner

V. GARNER, Assistant Examiner

U.S. Cl. X.R.

260—343, 537 P